US010460461B2

(12) United States Patent
Higuchi et al.

(10) Patent No.: US 10,460,461 B2
(45) Date of Patent: Oct. 29, 2019

(54) IMAGE PROCESSING APPARATUS AND METHOD OF CONTROLLING THE SAME

(71) Applicant: CANON KABUSHIKI KAISHA, Tokyo (JP)

(72) Inventors: Shugo Higuchi, Inagi (JP); Tatsuro Koizumi, Niiza (JP)

(73) Assignee: CANON KABUSHIKI KAISHA, Tokyo (JP)

(*) Notice: Subject to any disclaimer, the term of this patent is extended or adjusted under 35 U.S.C. 154(b) by 4 days.

(21) Appl. No.: 15/675,067

(22) Filed: Aug. 11, 2017

(65) Prior Publication Data

US 2018/0061070 A1 Mar. 1, 2018

(30) Foreign Application Priority Data

Aug. 31, 2016 (JP) .................................. 2016-170068

(51) Int. Cl.
*G06T 7/55* (2017.01)
*G06T 15/20* (2011.01)
*G06T 7/13* (2017.01)

(52) U.S. Cl.
CPC .................. *G06T 7/55* (2017.01); *G06T 7/13* (2017.01); *G06T 15/205* (2013.01); *G06T 2200/08* (2013.01); *G06T 2207/10004* (2013.01); *G06T 2207/10028* (2013.01)

(58) Field of Classification Search
CPC ............. G06T 7/55; G06T 2207/10004; G06T 2200/08; G06T 15/205
See application file for complete search history.

(56) References Cited

U.S. PATENT DOCUMENTS

| 2006/0120593 | A1* | 6/2006 | Oshino | H04N 13/305 382/154 |
| 2007/0122027 | A1* | 5/2007 | Kunita | G06T 15/205 382/154 |
| 2010/0074468 | A1* | 3/2010 | Panahpour Tehrani | G06T 7/596 382/100 |
| 2011/0102596 | A1* | 5/2011 | Kotani | G08B 13/19645 348/159 |
| 2012/0141016 | A1* | 6/2012 | Wildeboer | H04N 13/271 382/154 |

(Continued)

FOREIGN PATENT DOCUMENTS

JP          5011224 B2     8/2012

*Primary Examiner* — Yon J Couso
(74) *Attorney, Agent, or Firm* — Rossi, Kimms & McDowell LLP

(57) ABSTRACT

The invention comprises a depth-image generator which, based on shape information representing a shape of an object in the captured images of the cameras, generates depth images corresponding to the captured images obtained from a plurality of cameras; a detector which, based on a generated depth image, detects a boundary region of the object in a corresponding captured image; a pixel map generator which, based on the boundary region in the captured image detected by the detector, generates a pixel map representing a contributing ratio for generating the virtual-viewpoint image for each pixel position of the captured image; and an output-image generator which generates the virtual-viewpoint image based on the captured images obtained from the plurality of cameras, and the pixel map corresponding to the captured images.

14 Claims, 15 Drawing Sheets

(56) References Cited

U.S. PATENT DOCUMENTS

2013/0245828 A1\* 9/2013 Tateno .................. B25J 9/1697
700/259

\* cited by examiner

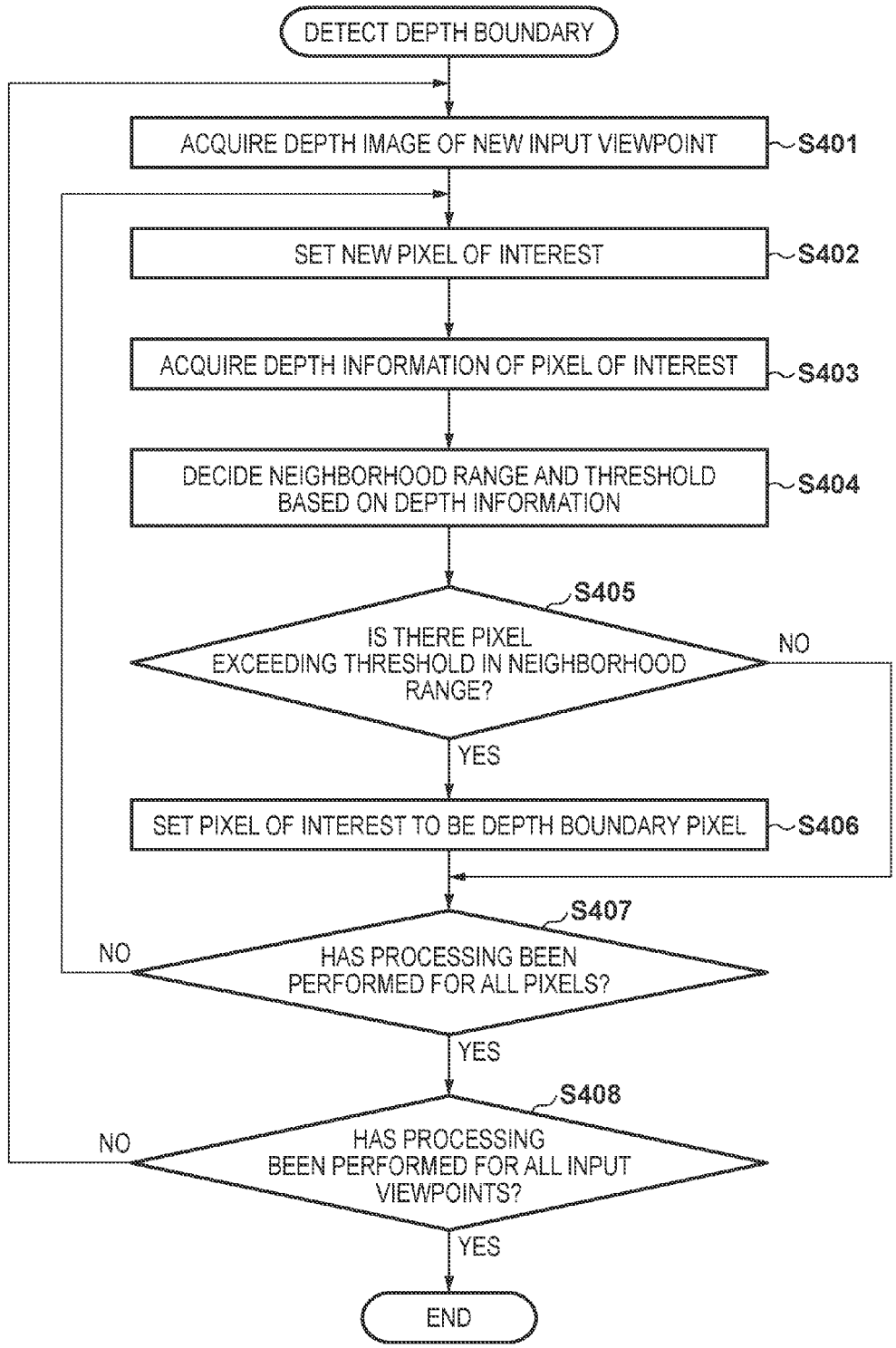

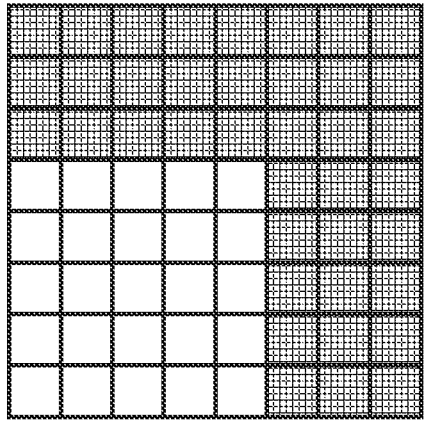
FIG. 7A INPUT IMAGE
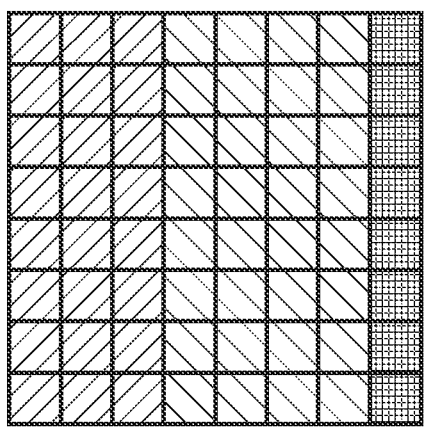
FIG. 7B BACKGROUND IMAGE
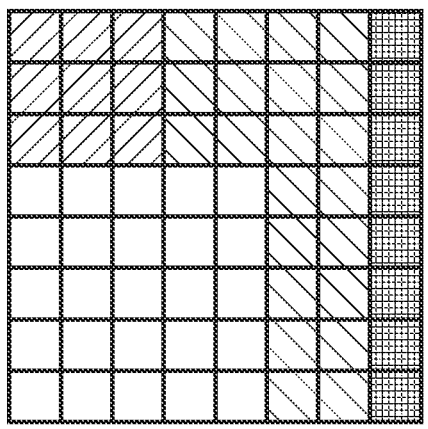
FIG. 7C SILHOUETTE IMAGE (BINARY)

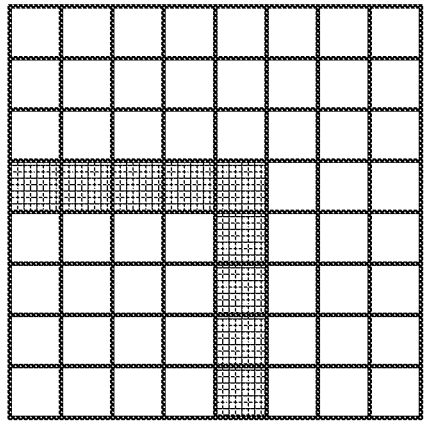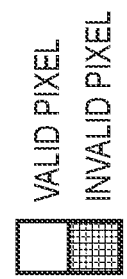
FIG. 8A DEPTH-BOUNDARY IMAGE — NON-BOUNDARY REGION / BOUNDARY REGION
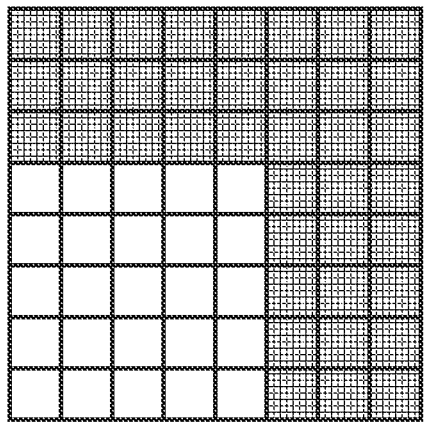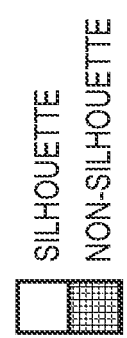
FIG. 8B SILHOUETTE IMAGE — SILHOUETTE / NON-SILHOUETTE
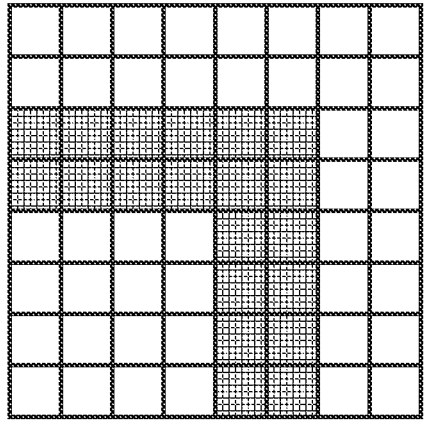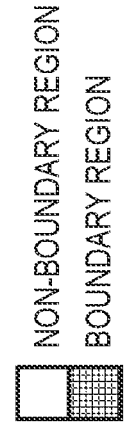
FIG. 8C VALID-PIXEL MAP — VALID PIXEL / INVALID PIXEL

DEPTH-BOUNDARY IMAGE

WEIGHTED-PIXEL MAP

DISTANCE: 3 OR MORE
DISTANCE: 2
DISTANCE: 1
DISTANCE: 0

WEIGHTING
BOUNDARY DISTANCE

RELATIONSHIP BETWEEN WEIGHTING AND DISTANCE

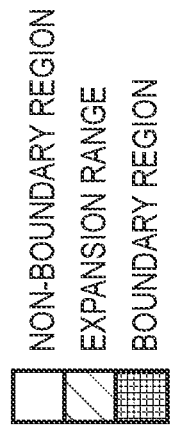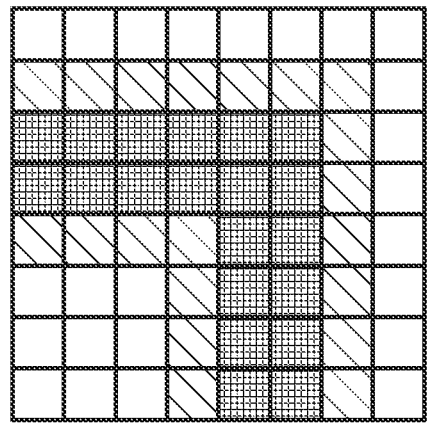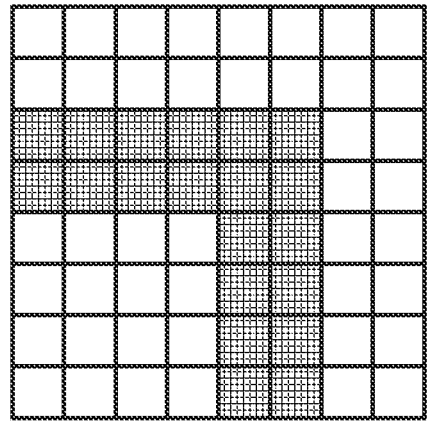

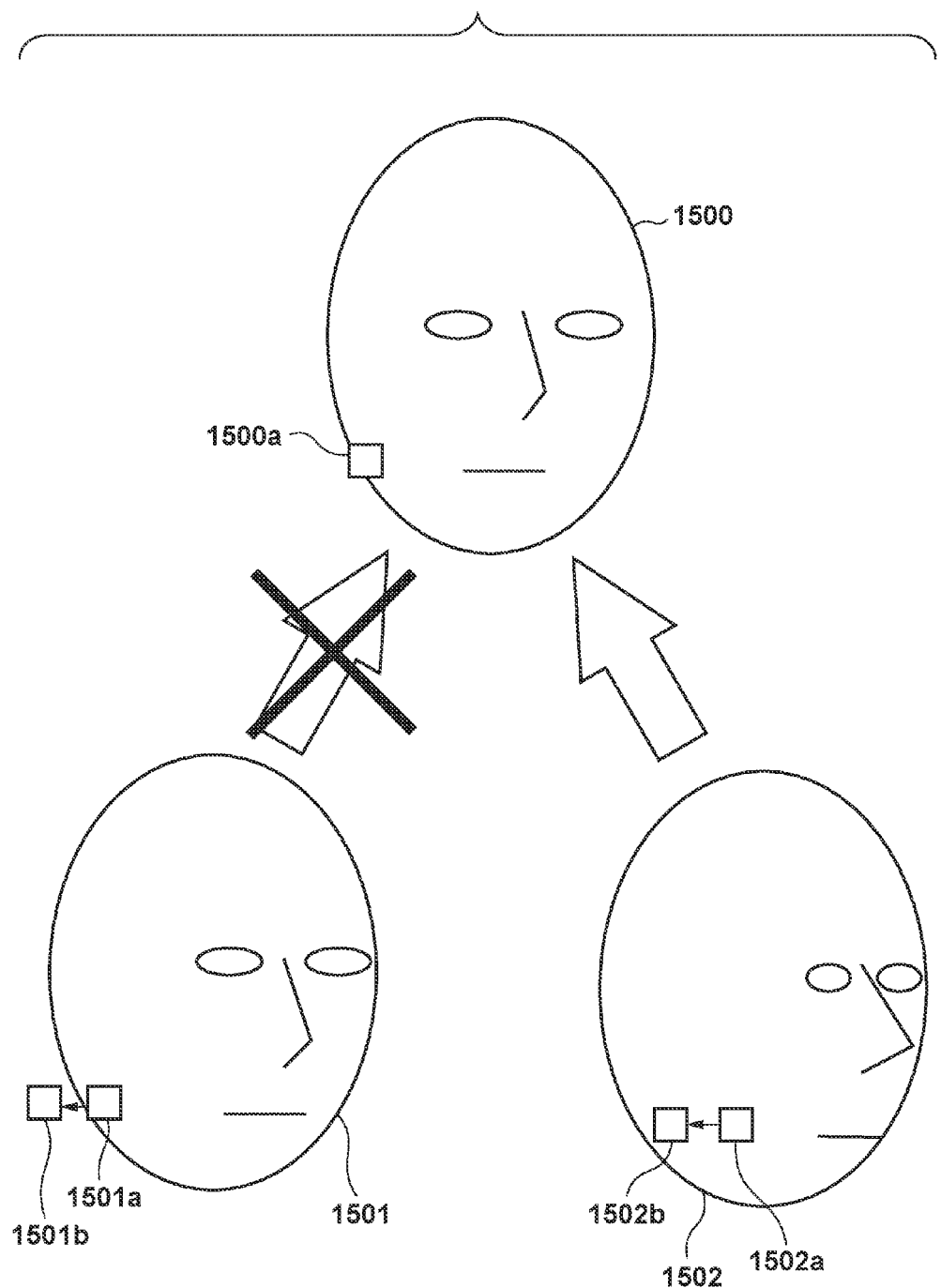

IMAGE PROCESSING APPARATUS AND METHOD OF CONTROLLING THE SAME

BACKGROUND OF THE INVENTION

Field of the Invention

The present invention is related to a technique for, based on images that are captured from a plurality of viewpoint positions, generating an image from a set virtual-viewpoint position.

Description of the Related Art

A technique of obtaining a three-dimensional model of an object (for example, a person or the like) from images captured by a plurality of cameras, and generating, from a plurality of captured images, an image (hereinafter referred to as a virtual-viewpoint image) at an arbitrary viewpoint (hereinafter referred to as a virtual-viewpoint) at which no camera is actually present is known (for example, Japanese Patent No. 5011224).

At this time, the shape of the object in the virtual-viewpoint image is obtained from the three-dimensional model, and a region that its shape encompasses is generated by texture mapping. The color of a pixel used in this texture mapping is obtained by referencing a real image (hereinafter referred to as a reference image) that is close to the virtual-viewpoint in the line of sight direction with a high weighting.

While the position and line of sight direction, and camera parameters, such as the focal length, of the plurality of cameras are known, a certain amount of error is included in these. Accordingly, a three-dimensional model of an object obtained from the plurality of cameras naturally also includes error. As a result of this, a pixel in the reference image referenced when deciding the color of a pixel positioned in an object in the virtual-viewpoint image, and in particular in the outline (edge portion) of such an object, is not necessarily positioned within that object. For example, a pixel corresponding to a reference image when obtaining a color of a pixel of the edge portion of the face of a person in the virtual-viewpoint image may end up being a pixel outside of the face of that person (for example, a pixel representing a floor). When such a situation occurs, an object (and in particular, its outline) in a virtual-viewpoint image that is generated ends up being an unnatural color, and image degradation cannot be avoided.

SUMMARY OF THE INVENTION

The present invention was conceived in view of these issues, and provides a technique for suppressing image degradation of an object in a virtual-viewpoint image more than conventionally.

According to an aspect of the invention, there is provided an image processing apparatus for generating, from captured images that are captured by a plurality of image capturing units, a virtual-viewpoint image according to a set virtual-viewpoint position, the apparatus comprising: a first generating unit configured to, based on shape information representing a shape of an object in the captured images, generate depth images corresponding to the captured images obtained from the plurality of image capturing units; a detecting unit configured to, based on a depth image generated by the first generating unit, detect a boundary region of the object in a corresponding captured image; a second generating unit configured to, based on the boundary region in the captured image detected by the detecting unit, generate a pixel map representing a contributing ratio for generating the virtual-viewpoint image for each pixel position of the captured image; and a third generating unit configured to generate the virtual-viewpoint image based on the captured images obtained by capturing by the plurality of image capturing units, and the pixel map.

According to the present invention, it is possible to suppress image degradation of an object in a virtual-viewpoint image compared to conventional techniques.

Further features of the present invention will become apparent from the following description of exemplary embodiments (with reference to the attached drawings).

BRIEF DESCRIPTION OF THE DRAWINGS

FIG. 4 is a flowchart for describing processing for detecting a depth boundary.

FIGS. 7A-7C are views for describing a silhouette image generation principle.

FIGS. 8A-8C are views for describing a valid-pixel map generation principle.

FIGS. 11A and 11B are views for describing another weighting map generation principle.

FIG. 15 is a view for explaining a concept of the embodiment.

DESCRIPTION OF THE EMBODIMENTS

Explanation in detail is given below for an embodiment according to the present invention, in accordance with the drawings.

Figure 1:
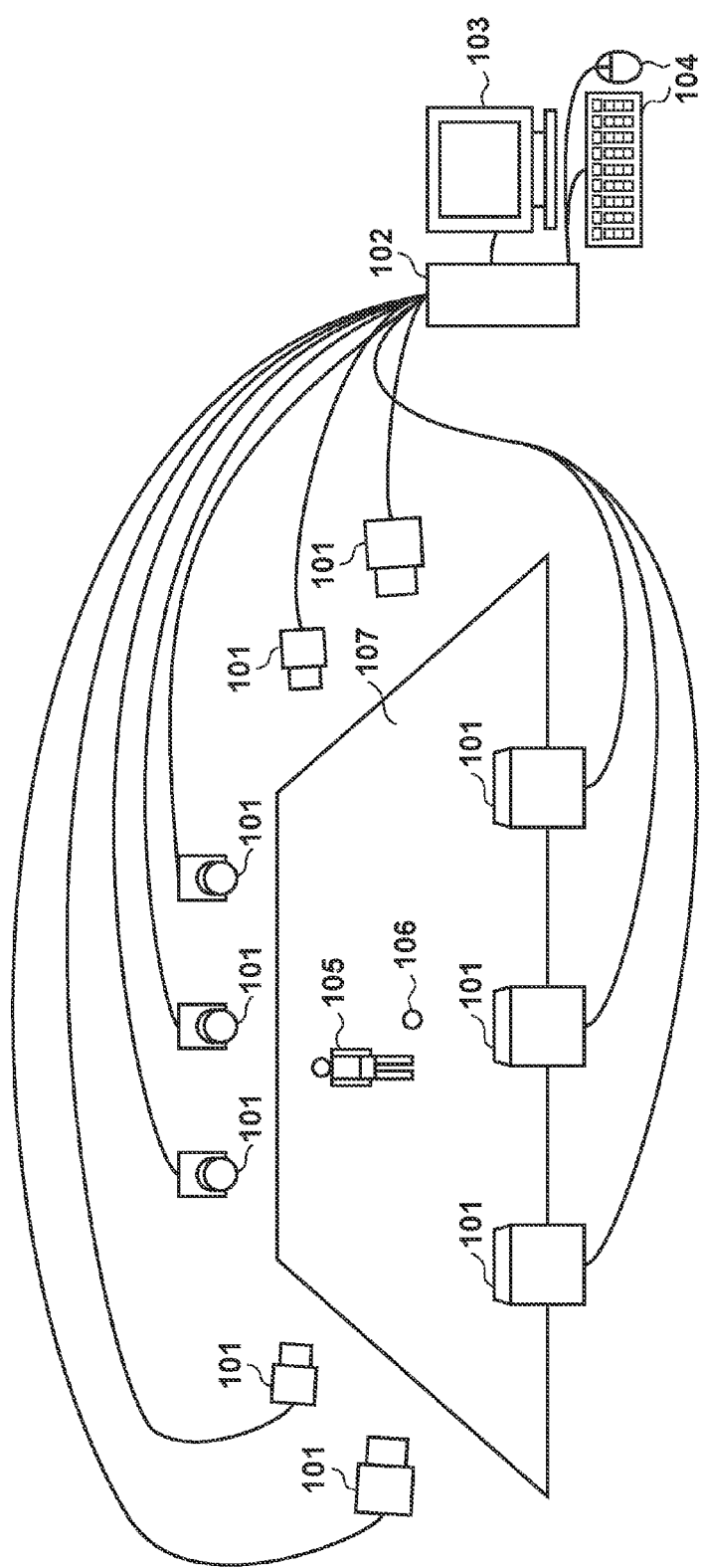
FIG. 1 is a configuration view of an image processing system in an embodiment.

FIG. 1 illustrates a capturing environment and configuration of an image processing system in an embodiment. As in the figure, the present system is configured by a plurality of cameras 101; an information processing apparatus 102 that receives and accumulates the images captured by each of the cameras 101, and generates virtual-viewpoint images; a monitor 103; a user instruction input unit 104 such as a keyboard or a mouse; and the like. Also, in the embodiment, as shown graphically, an example in which objects 105 and 106 are positioned on a floor 107 which is a background image is illustrated. Note that in the FIG. 10 cameras are illustrated, but there is no particular limitation to this number. However, it is desirable that there are at least a plurality of cameras on each of the four sides. Also, in the figure, it is envisioned that the object 105 is a person, and the object 106 is a ball, but the types and numbers of the objects is not limited. The figure should be recognized to be only an example.

The information processing apparatus 102 is of a configuration similar to an apparatus typified by a personal computer or the like. That is, the information processing apparatus 102 comprises a CPU that is responsible for control of the apparatus, a ROM, a RAM, an external storage apparatus such as a hard disk or the like. Also, an OS (operating system), an application program for functioning as an image processing apparatus, or the like is stored in an external storage apparatus. Also, the OS is loaded into the RAM, the application is loaded into the RAM under the operation of the OS, and when the application is executed, the information processing apparatus 102 functions as an image processing apparatus.

Information (hereinafter referred to as input-viewpoint information) according to the installation position, line of sight direction, and camera parameters (focal length and the like) of each of the cameras 101 is assumed to be already held in an external storage apparatus that the information processing apparatus has. Also, it is assumed that images (background images) captured by each of the cameras 101 in a state in which objects are excluded are already held in the external storage apparatus.

Figure 2:
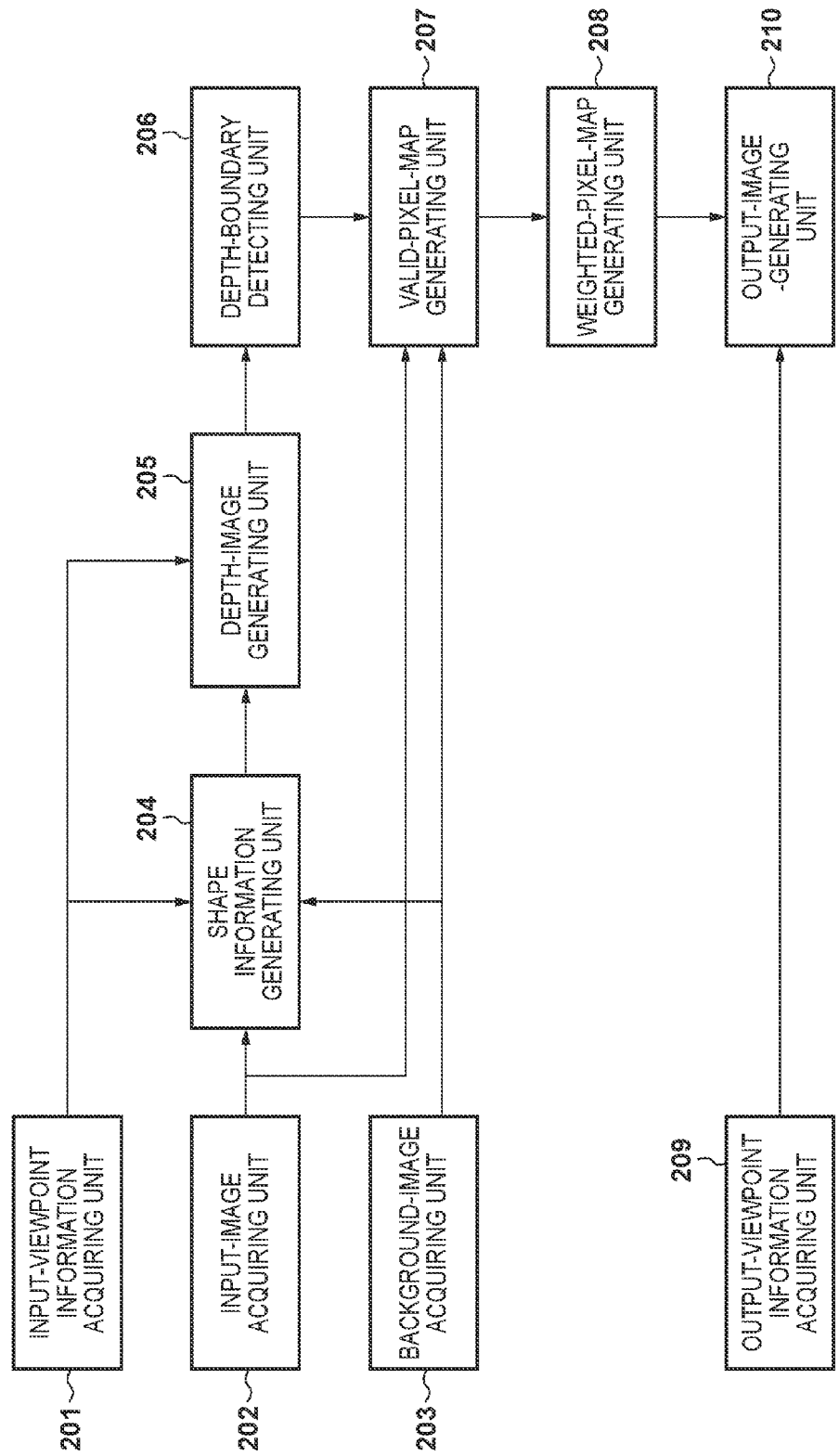
FIG. 2 is a view of a functional block configuration of an image processing apparatus in an embodiment.

FIG. 2 is a functional block configuration view in a case where the CPU of the information processing apparatus 102 executes the application program and functions as an image processing apparatus. Note that it is possible that not all of the configurations shown graphically are realized by a program and some of them are realized by hardware.

The image processing apparatus in the embodiment comprises an input-viewpoint information acquiring unit 201, an input-image acquiring unit 202, and a background-image acquiring unit 203. Also, the image processing apparatus has a shape information generating unit 204, a depth-image generating unit 205, a depth-boundary detecting unit 206, a valid-pixel-map generating unit 207, a weighted-pixel-map generating unit 208, an output-viewpoint information acquiring unit 209, and an output-image generating unit 210.

Prior to describing operation in the above described configuration, a concept in the present embodiment will be described.

When images including objects are captured by a plurality of cameras whose position and line of sight direction are known, it is possible to obtain shape information representing a three-dimensional shape of an object by a known technique. The shape of an object in three-dimensional space can be defined, which means that it is possible to obtain the shape by calculating depth images corresponding to the images captured by the respective cameras. Note that a depth image here is a set of pixels that represent distances between the viewpoint of a camera and points on a surface of an object. Also, for the same reason, it can be seen that it is possible to generate a depth image from a perspective of an arbitrary viewpoint position and line of sight direction.

When a difference between two neighboring pixels in a depth image is small, it means that the positions that those pixels represent are almost the same distance from the viewpoint. Conversely, if the difference between the pixel values of two pixels is large it means that there is a large difference between the distance from the viewpoint of one pixel and the distance from the viewpoint of the other pixel. Accordingly, from the difference between adjacent pixels in the depth image it is possible to determine whether the pixel is a pixel belonging to the background or a pixel belonging to an object.

A case in which, in order to generate a virtual-viewpoint image 1500 illustrated in FIG. 15, a pixel value (color) of a pixel 1500a in a virtual-viewpoint image is decided based on a depth image corresponding to the virtual-viewpoint image 1500 is considered. A captured image that is captured at a viewpoint position/line of sight direction that is closest to the virtual-viewpoint position/line of sight direction of the virtual-viewpoint image 1500 is an image denoted by reference numeral 1501, and a pixel thereof corresponding to the pixel 1500a is a pixel 1501a. If the shape information is accurate, the pixel 1501a is present in the object, and therefore the pixel value (color) of the pixel 1501a may be made to be the pixel value of the pixel 1500a. However, there is an error in the shape information and the viewpoint information, and what corresponds to the pixel 1500a is determined not to be the pixel 1501a but the pixel 1501b, which is, for example, two pixels separated therefrom, and the pixel 1501b happens to be positioned outside of the object. In such a case, the pixel 1500a is not an intended color.

The inventors surmised that it is possible to suppress the occurrence of the above described problem even if there is error by treating the degree of contribution to the virtual-viewpoint image to be higher the more a corresponding pixel is at a position that is separated from the boundaries of the object and within the object. That is, the corresponding pixel in the case of a captured image 1502 should be the pixel 1502a, because of the error in the shape information it becomes a pixel 1502b which is misaligned by a few pixels, but since the pixel 1502b is present within the object, the color of the pixel 1500a is suppressed from becoming unnatural. That is, an image of a position and line of sight direction that is somewhat separated is made to be the reference image rather than the closest one with respect to the viewpoint position and the line of sight direction of the virtual-viewpoint image.

To achieve the above, configuration may be taken to not reference (contribution rate in relation to the virtual-viewpoint image is low) a pixel that is close to an edge that the depth image represents within an object. Because the corresponding pixel 1501a in the image 1501 is close to the edge of the object 1501 in accordance with this condition, the image 1501 is decided to be a non-reference image. Also, because the corresponding pixel 1502a in the image 1502 is within the object 1502 and positioned somewhat separated from the edge, the image 1502 is used as a reference image.

The foregoing is the concept as to how to decide pixel values of a virtual-viewpoint image in the present embodiment. Below, specific configuration and processing will be described. Note that in the following description, each type of image (depth image, depth-boundary image, valid-pixel map, and the like) that appears is described as being allocated and stored in a RAM that the information processing apparatus comprises.

Figure 3:
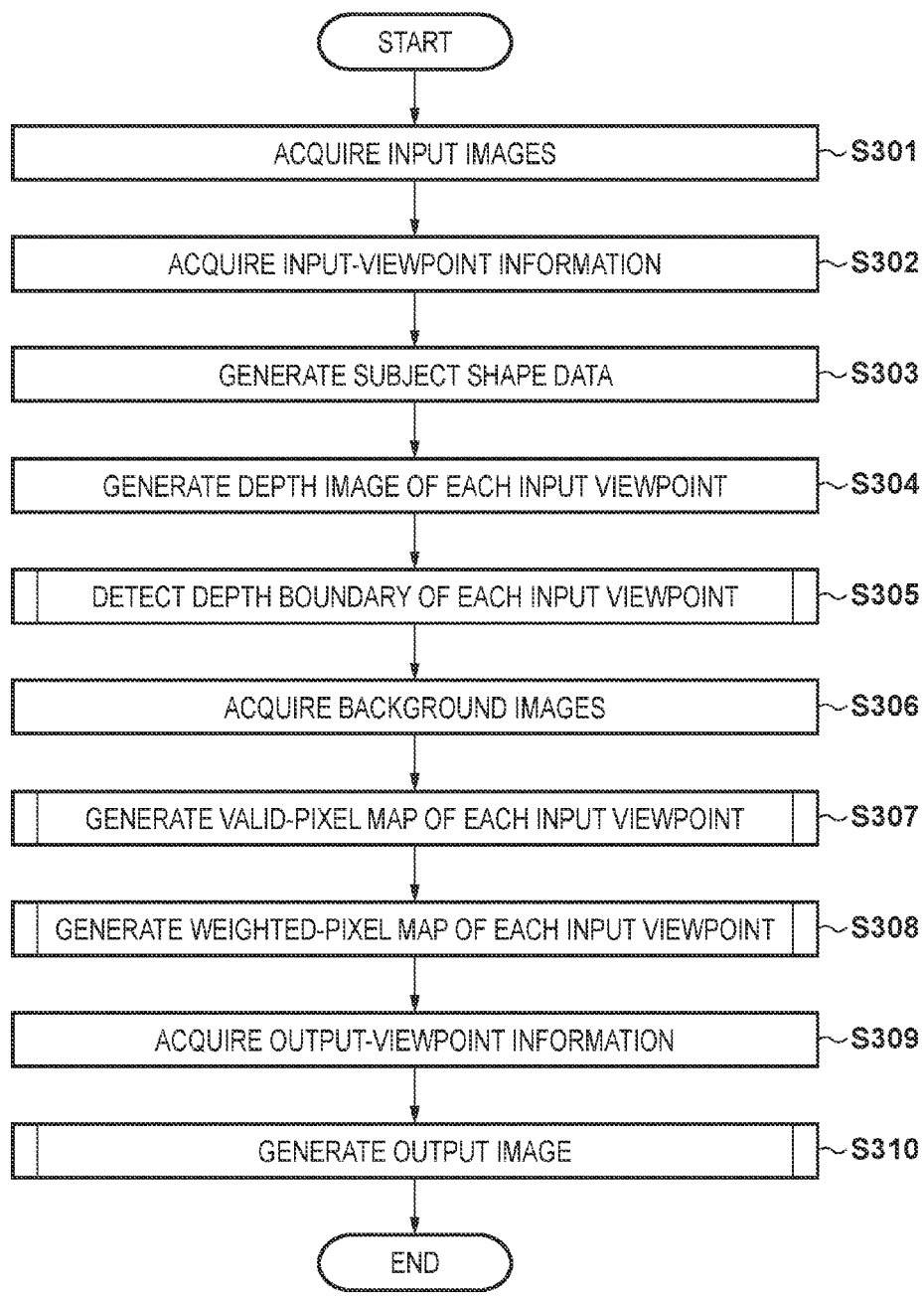
FIG. 3 is a flowchart for describing a series of processes until a virtual-viewpoint image is generated in the embodiment.

FIG. 3 is a flowchart that illustrates an overall flow of virtual-viewpoint image generation processing in the configuration of FIG. 2. Below, operation of the image processing apparatus of the embodiment will be described in accordance with the same figure.

In step S301, the input-image acquiring unit 202 acquires image data that the cameras 101 respectively captured in a state in which the objects 105 and 106 are present. Then, in step S302, the input-viewpoint information acquiring unit 201 acquires input-viewpoint information held in the external storage apparatus. Next, in step S303, the shape information generating unit 204 generates three-dimensional object shape data of the objects 105 and 106 based on the input-viewpoint information, the image data from each camera, and background image data captured by each of the cameras 101 which is held in the external storage apparatus in advance. Note that because the method of generating object shape data is known, description thereof is omitted.

After the generation, the depth-image generating unit 205, in step S304, generates the number of cameras worth of depth images which correspond to the images captured at the viewpoint and line of sight direction of each of the cameras 101, based on the generated object shape data (details described later). The depth image here, as described previously, is a set of pixels representing the distances from the viewpoint.

In step S305, a depth-image boundary detection unit 206 detects boundary regions of each depth image (details described later). Next, in step S306, the valid-pixel-map generating unit 207 acquires background images that the cameras 101 captured previously. The valid-pixel-map generating unit 207, in step S307, generates valid-pixel maps, based on the images including the background image and the objects captured at the viewpoint position and line of sight direction of each camera, and the depth-boundary images (details described later). Then, in step S308, a weighted-pixel-map generating unit 308 generates weighted-pixel maps from the valid-pixel maps. In step S309, the output-viewpoint information acquiring unit 209 acquires a virtual-viewpoint position and a virtual line of sight direction via the instruction input unit 104. Finally, in step S310, the output-image generating unit 210 generates a virtual-viewpoint image from the perspective of the inputted virtual-viewpoint position and virtual line of sight direction, based on the images including the objects captured by each camera, the object shape data, and the weighted-pixel map and outputs the virtual-viewpoint image (details described later).

Next the processing of step S305 by the depth-boundary detecting unit 206 is described in accordance with the flowchart of FIG. 4. Note that prior to the description, it is assumed that a depth-boundary image for which all pixels of the depth image are initialized to values indicating a non-boundary pixel is prepared in advance. It is sufficient to hold information as to whether a pixel is a boundary or non-boundary pixel, and so one pixel of the depth-boundary image may be binary (1 bit).

In step S401, the depth-boundary detecting unit 206 acquires a depth image of a viewpoint position and a line of sight direction of one camera, and in step S402, sets the pixel of interest to a predetermined position in the depth image. For example, in a case of scanning in a raster scan order, the initial position is the upper left corner position of the depth image. Next, in step S403, the depth-boundary detecting unit 206 acquires a pixel value (depth information) of the pixel of interest, and in step S404, the depth-boundary detecting unit 206 decides the threshold for the boundary determination based on the pixel value. Specifically, the larger the depth value, the larger the threshold is. For example, a function that takes a depth value as an argument may be prepared, and a table for transforming a depth value into a threshold may also be used.

Next, in step S405, the depth-boundary detecting unit 206, in the neighboring pixels surrounding the pixel of interest (for example, the region of M×N pixels whose center is the pixel of interest), the absolute value of the difference with the pixel of interest and the threshold are compared, and it is determined whether there is a pixel that exceeds the threshold. In the case where there is such a pixel, the pixel of interest is a pixel positioned in the vicinity of a depth image boundary, and so the depth-boundary detecting unit 206 writes a value indicating a boundary pixel at the corresponding position of the depth-boundary image in step S406.

After that, the processing proceeds to step S407, the depth-boundary detecting unit 206 determines whether processing has been performed for all of the pixels of the focus depth image, and if not, the processing returns to step S402, the pixel of the next position is decided to be the pixel of interest, and the above described processing repeats.

Meanwhile, in a case where it is determined that the boundary determination has finished for all of the pixels of the focus depth image, the processing proceeds to step S408. In step S408, the depth-boundary detecting unit 206 determines whether or not the boundary determination has finished for all depth images corresponding to the images captured by the cameras 101, and if not, in order to perform the processing on the next depth image, the processing from step S401 repeats.

Figure 5A:
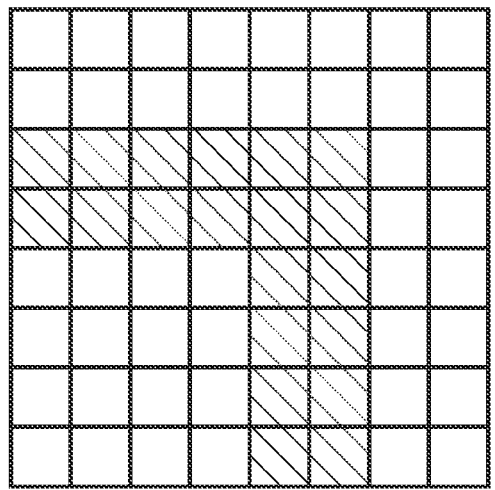
FIGS. 5A and 5B are views for describing a depth boundary detection principle.
Figure 5B:
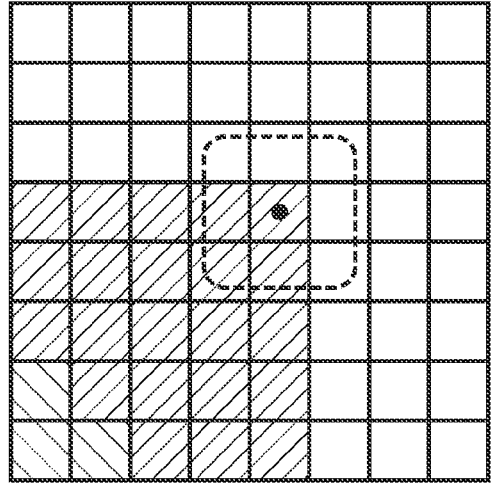

An example of a depth image is illustrated in FIG. 5A and an example of a generated depth-boundary image is illustrated in FIG. 5B for a case in which, in the above described processing, the range of the neighboring pixels is 3×3 pixels. M and N of the range defining the neighboring pixels are not limited to 3, and may be changed to depend on the depth value of the pixel of interest.

As a result of the above, depth-boundary images respectively corresponding to the images captured by all of the camera 101 are obtained.

Figure 6:
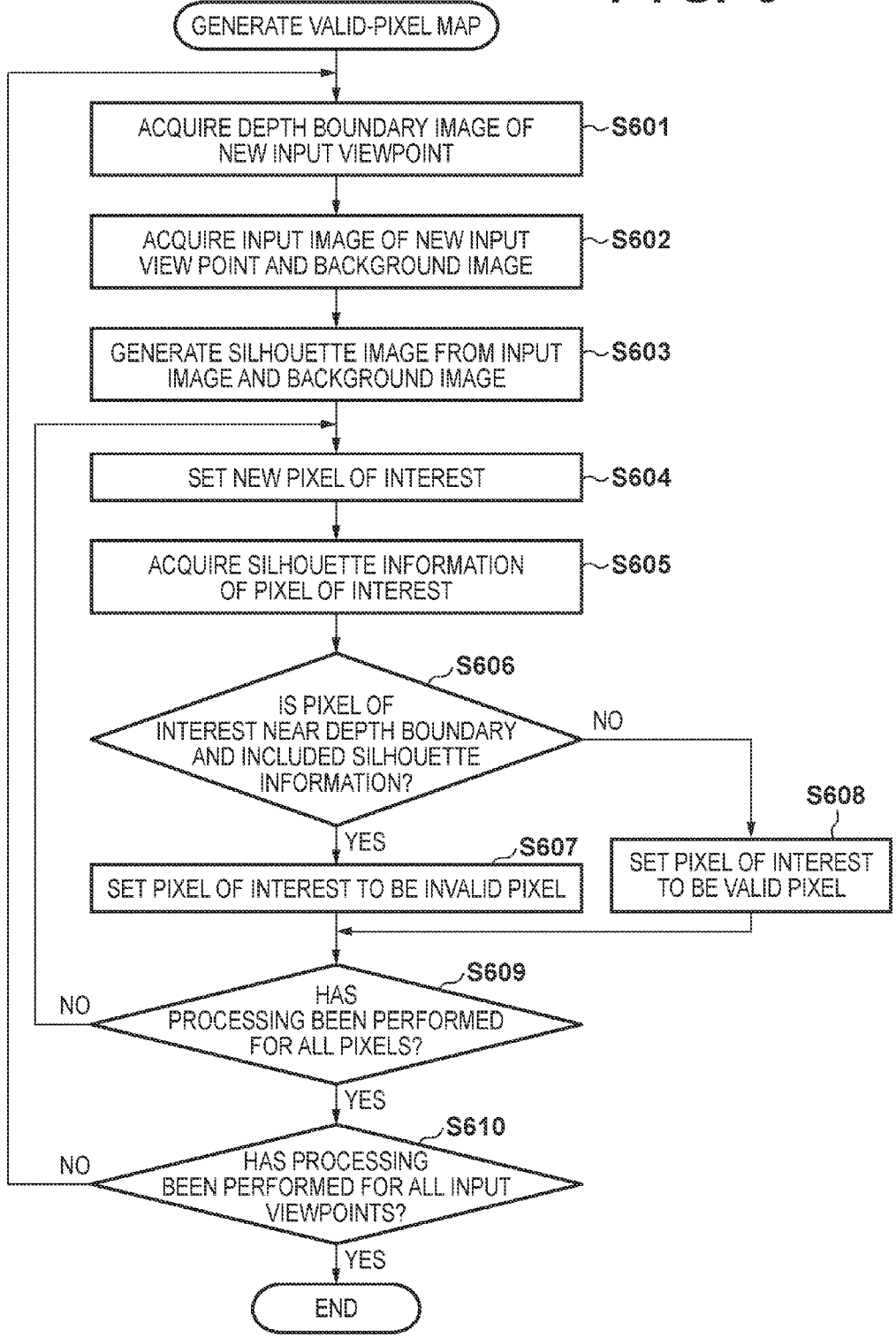
FIG. 6 is a flowchart for describing processing for generating a valid-pixel map in the embodiment.

Next, processing for generating valid-pixel maps by the valid-pixel-map generating unit 207 (step S307 of FIG. 3) is described in accordance with the flowchart of FIG. 6.

The valid-pixel-map generating unit 207, in step S601, acquires the depth-boundary image generated from the depth image for one camera, and in step S602, acquires the input image including objects that is captured by the focus camera and the background image captured by the same camera. From these, the valid-pixel-map generating unit 207 generates a silhouette image (binary) that distinguishes objects from the background in step S603.

FIG. 7A is an input image and FIG. 7B is a background image. In the case where an object is not present, pixels at the same coordinate positions in the two images have the same values. However, considering error, a pixel is determined not to be of an object if the absolute value of the difference of the pixels is within an allowable error set in advance, and the pixel is determined to be of an object in a case where an allowable error is exceeded. FIG. 7C illustrates a silhouette image that makes the results of this determination into pixels. In the case of the figure, the representation is such that the white pixels are within the object, and the black pixels are outside of the object.

In step S604, the valid-pixel-map generating unit 207 sets the pixel of interest to a predetermined position in the depth-boundary image. For example, in a case of scanning in a raster scan order, the initial position is the upper left corner position of the depth-boundary image. Next, in step S605, the valid-pixel-map generating unit 207 acquires the pixel value (silhouette information) of the pixel at the same position as the pixel of interest in the silhouette image. Then, the valid-pixel-map generating unit 207 determines whether or not the pixel of interest satisfies the condition that it is positioned at the depth boundary and is within the silhouette. If this condition is satisfied, the valid-pixel-map generating unit 207 sets the pixel of the corresponding position of the valid-pixel map to be an invalid pixel (step S607). Specifically, the valid-pixel-map generating unit 207 makes the corresponding pixel be a non-reference pixel when deciding the pixel values of the virtual-viewpoint image. Meanwhile, if this condition is not satisfied, the valid-pixel-map generating unit 207 sets the pixel of the corresponding position of the valid-pixel map to be a valid pixel (step S608). Specifically, it sets the pixel to be a pixel that can be referenced when deciding the pixel values of the virtual-viewpoint image.

After that, the processing proceeds to step S609, and it is determined whether or not all pixels of the valid-pixel map have been decided, and if not, the processing returns to step S604, and the pixel of the next position is decided as the pixel of interest, and the above described processing repeats.

Meanwhile, in a case where it is determined that the all pixel values of the valid-pixel map been decided, the processing proceeds to step S610. In step S610, it is determined whether or not valid maps corresponding to the images captured by all the cameras have been generated, and if not, repeats the processing from step S601 so as to generate the next valid-pixel map.

FIG. 8A is an example of a depth-boundary image, FIG. 8B is an example of a silhouette image, and FIG. 8C is an example of a valid-pixel map. As illustrated in FIG. 8C, a pixel positioned at a depth-boundary is set as an invalid pixel in the silhouette.

Figure 9:
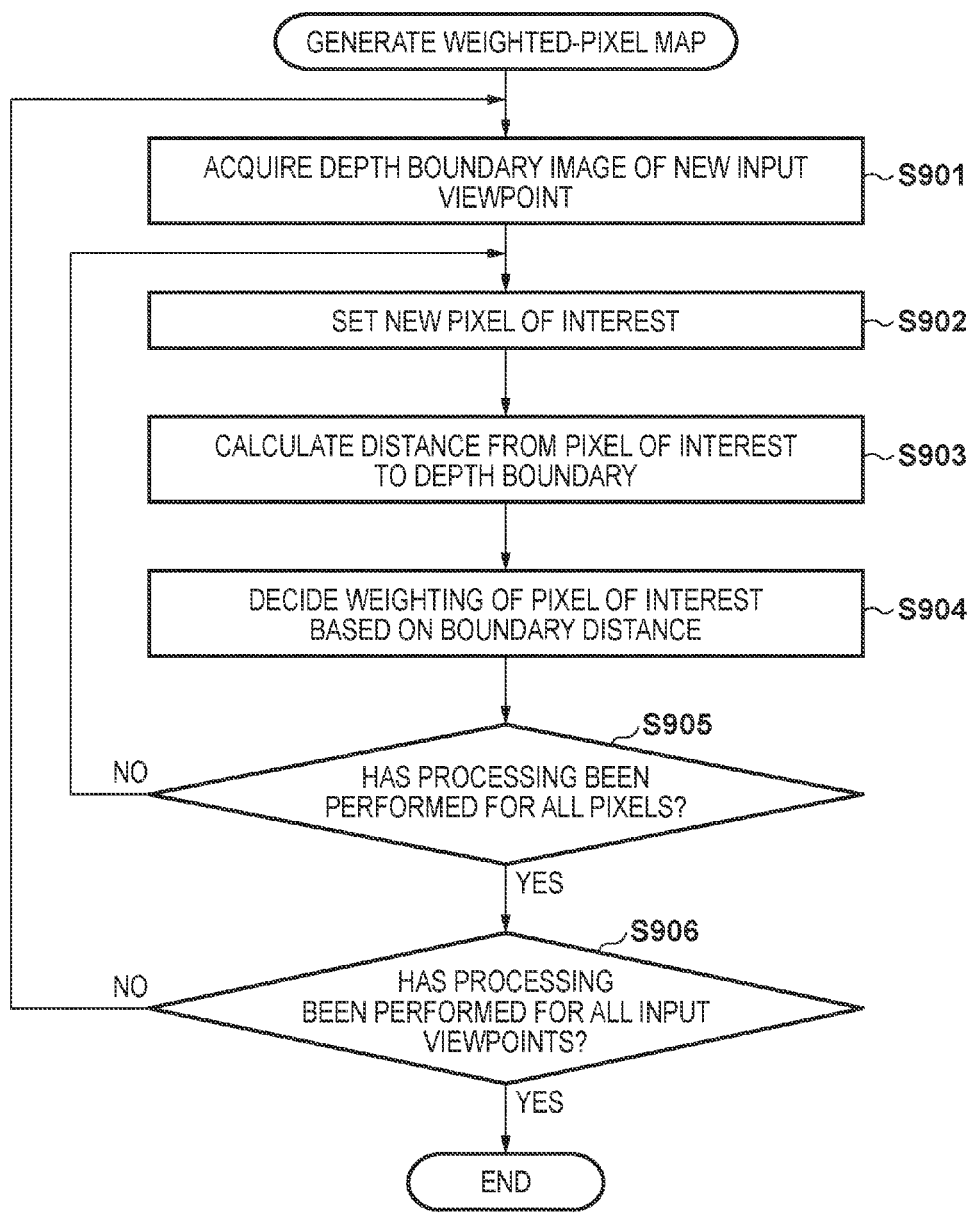
FIG. 9 is a flowchart for describing processing for generating a weighted-pixel map.

Next, processing for generating a weighted-pixel-map by the weighted-pixel-map generating unit 208 (step S308 of FIG. 3) is described in accordance with the flowchart of FIG. 9.

The weighted-pixel-map generating unit 208, in step S901, acquires a depth-boundary image for one camera. Then, the weighted-pixel-map generating unit 208, in step S902, sets the pixel of interest to a predetermined position in the acquired depth-boundary image. For example, in a case of scanning in a raster scan order, the initial position is the upper left corner of the depth-boundary image.

Next, the weighted-pixel-map generating unit 208, in step S903, searches for the depth boundary closest to the position of the pixel of interest, and calculates the distance to the depth boundary. Then, in step S904, the weighted-pixel-map generating unit 208 stores a weighting of the pixel of interest in accordance with the calculated distance, with the pixel value in a weighted-pixel map.

In step S905, the weighted-pixel-map generating unit 208 determines whether or not the weightings of all pixels have been decided. If not, the processing is returned to step S902, and sets the next pixel as the pixel of interest. Meanwhile, in the case where generation of the weighted-pixel map for the focused camera is finished, it is determined in step S906 whether or not the generation of a weighted-pixel map has finished for all cameras, and if not, the process is returned to step S901.

Figure 10A:
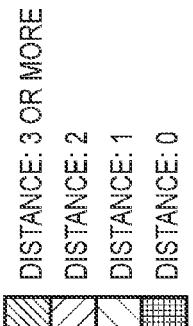
FIGS. 10A-10C are views for describing a weighting map generation principle.
Figure 10B:
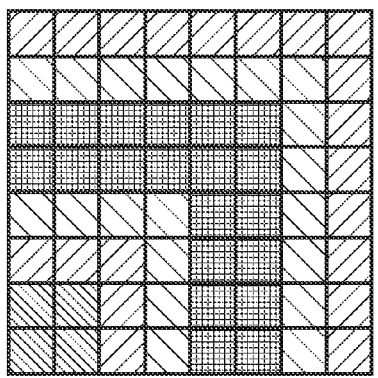
Figure 10C:
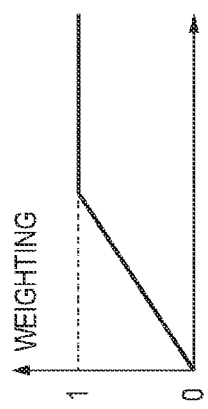

FIG. 10A illustrates a depth-boundary image, FIG. 10B illustrates a weighted-pixel map, and FIG. 10C illustrates a relationship between distance and weighting. It is possible to determine how far a pixel position is from the depth boundary simply by examining the value of the pixel of the desired position in the weighted-pixel map.

Note that in the calculation of the distance from the depth boundary, processing for finding the closest depth boundary from the pixel of interest is performed for all pixels other than the depth boundary pixels, and the corresponding amount of computation cannot be ignored. Accordingly, it is possible to accelerate the processing by limiting the pixel range for calculating distance to the depth boundary using morphology processing. For example, it is possible to perform expansion processing using a filter of a pixel size up to a distance to which calculation is desired, and calculate the distance to the depth boundary only for the expansion region.

Also, using morphology processing, a weighted-pixel map may be generated from the depth-boundary image. For example, it is assumed that pixels of the weighted-pixel map are represented by 8 bits. Then, pixels positioned at the depth boundary in the weighted-pixel map are set to 0 which is the minimum contribution rate, and pixels outside of the depth boundary are set to, for example, 255 (the maximum value for 8 bits).

FIG. 11A is a depth-boundary image (may be a valid-pixel map), and expansion processing is performed on the depth-boundary image using a 3×3 pixel size filter in relation to pixel values smaller than the value "255". At this time, as weighted-pixel map pixels, the value "1" which indicates the first time are overwritten in pixels expanded a first time. FIG. 11B, illustrates the weighted-pixel-map at this stage. Also, in the case where expansion processing is performed a second time, a value indicating that it is the second time is overwritten as a pixel of the weighted-pixel map. This processing is repeated an appropriate number of times thereafter. The result of this is that the pixel values of the weighted-pixel map are values corresponding to distances from the depth boundary, and it is possible to generate at high speed a weighted-pixel map of substantially the same effect as that illustrated in FIG. 10B.

Pixel values in the weighted-pixel map obtained in the foregoing processing represent distances from the boundary (an invalid pixel) of an object, but it is possible to see that a contributing ratio for contribution to the virtual-viewpoint image is represented.

Figure 12:
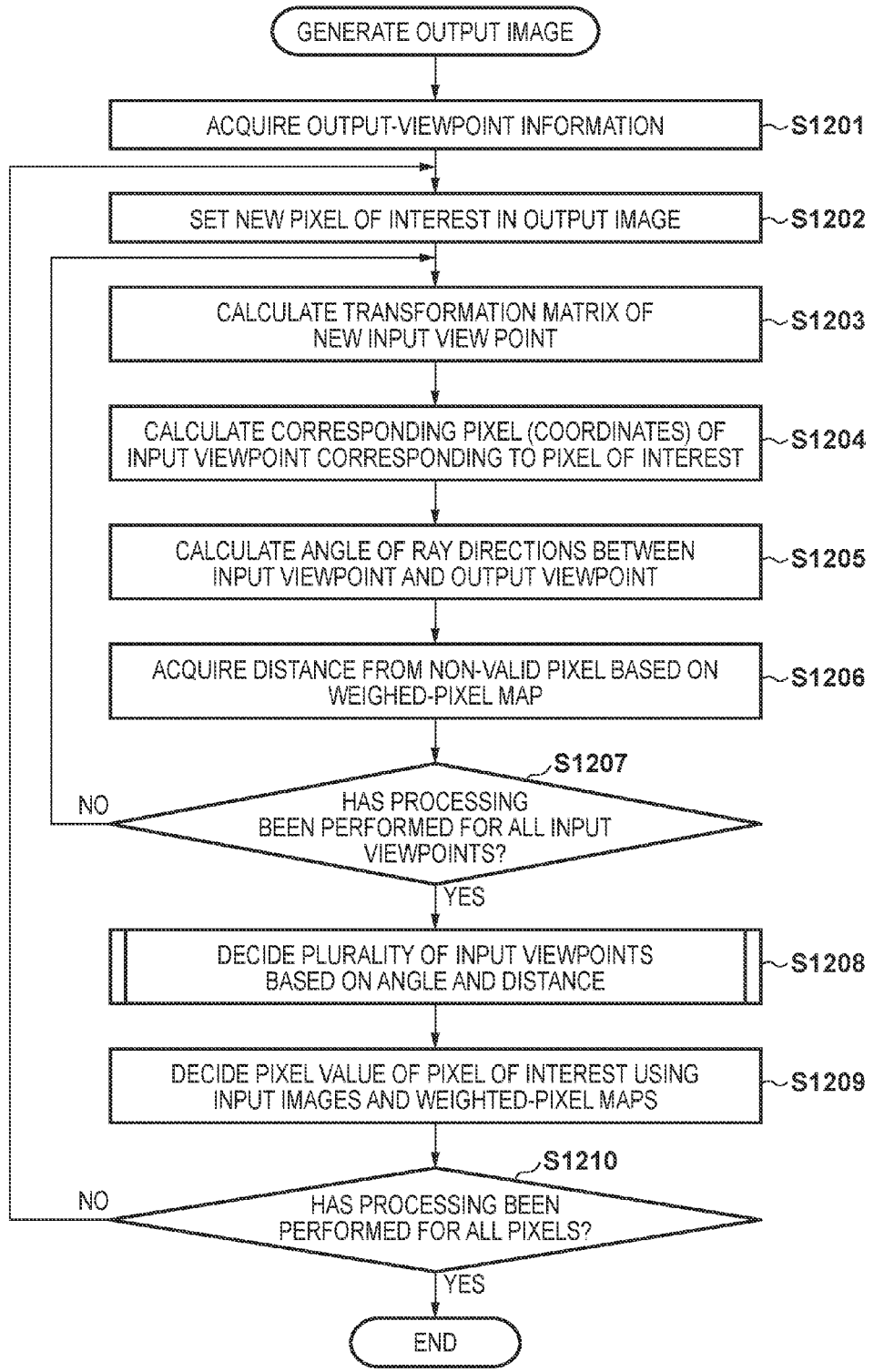
FIG. 12 is a flowchart for describing processing for generating the virtual-viewpoint image.

Next, processing for generating a virtual-viewpoint image by the output-image generating unit 210 (step S310 of FIG. 3) is described in accordance with the flowchart of FIG. 12.

The output-image generating unit 210, in step S1201, acquires output-viewpoint information (including a virtual-viewpoint position and a virtual line of sight direction) from the output-viewpoint information acquiring unit 209. Then, in step S1202, a pixel of interest is set at a predetermined position of the virtual-viewpoint image generated therefrom. If generation is in a raster scan order, the initial position of the pixel of interest is the upper left corner position. Next, in step S1203, the output-image generating unit 210 calculates an input viewpoint (the viewpoint position and line of sight direction of capturing by one camera) transformation matrix corresponding to the pixel of interest. In step S1204, the output-image generating unit 210 calculates a corresponding pixel (coordinates) of an input viewpoint corresponding to the pixel of interest. In step S1205, the output-image generating unit 210 calculates an angle of ray directions between an input viewpoint and an output viewpoint. In step S1206, the output-image generating unit 210 references the weighted-pixel map for the input viewpoint and acquires the distance from the depth boundary for the corresponding pixel.

In step S1207, the output-image generating unit 210 determines whether or not the foregoing processing was performed for all input viewpoints (all cameras), and if not, processing returns to step S1203 in order to perform the processing on the next input viewpoint.

When the foregoing processing finishes on all viewpoints, the output-image generating unit 210, in step S1208, decides a plurality of input viewpoints based on the angles that the viewpoints make and the distances. Then, in step S1209, the pixel value of the pixel of interest is decided using the input images and the weighted-pixel map.

After that, it is determined whether or not all pixels of the virtual-viewpoint image have been generated, and if not, the next pixel is made to be the pixel of interest, and the processing is returned to step S1202. In step S1210, if it is determined that all pixels have been generated, the output-image generating unit 210 outputs the generated virtual-viewpoint image to the monitor 103, and/or outputs it to the external storage apparatus as an image file.

Figure 13:
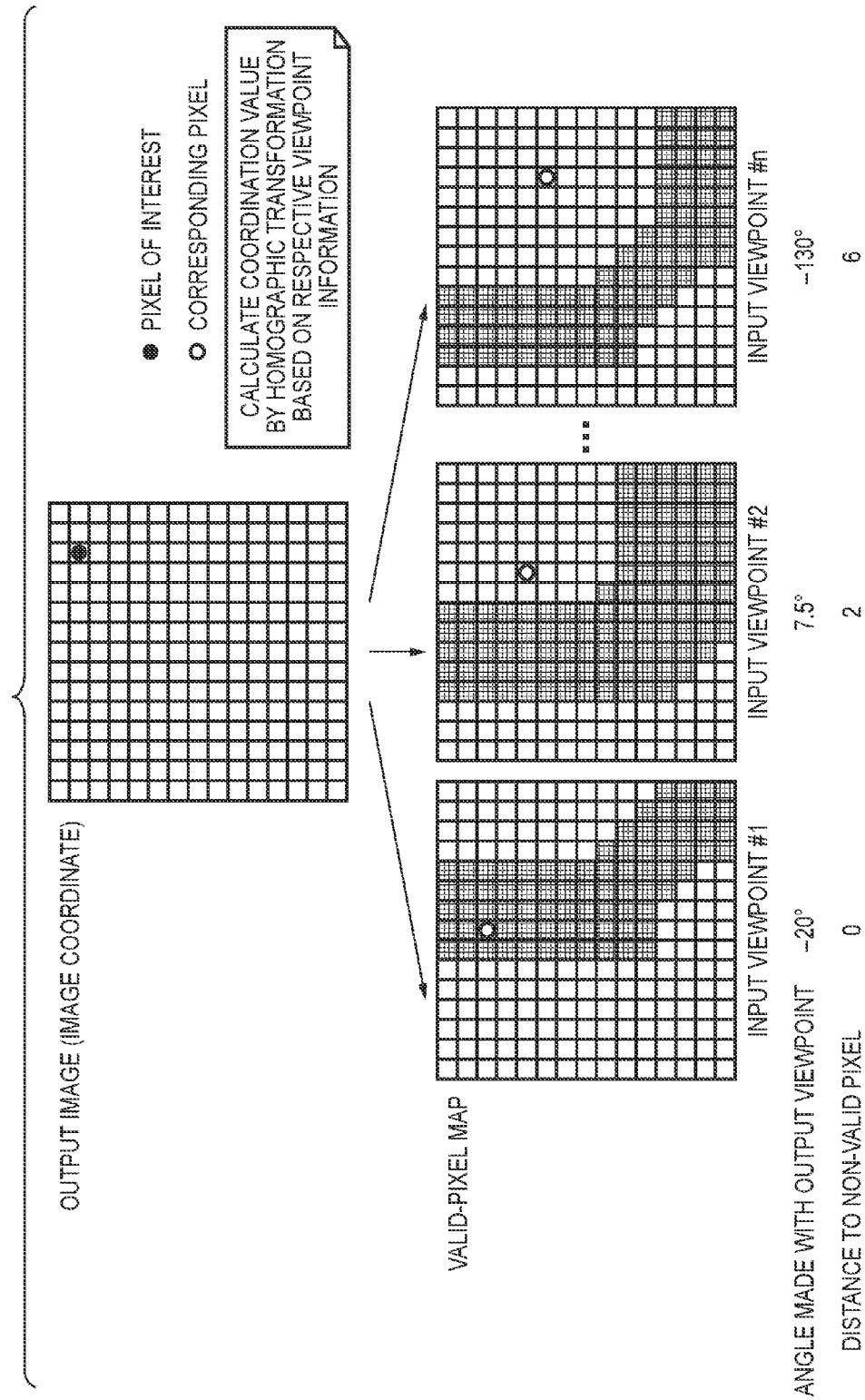
FIG. 13 is a view for describing processing for generating the virtual-viewpoint image.

Based on FIG. 13, processing for deciding the pixel of interest (black circle in the figure) in the output image (virtual-viewpoint image) is described. It is assumed that the corresponding pixel of each viewpoint that corresponds to the pixel of interest of the output image is the white circle in the figure. In the present embodiment, the distance until an invalid pixel of each white circle is obtained by referencing the weighted-pixel map. Accordingly, the pixel value of the pixel of interest is decided using N (2 in the embodiment) input viewpoints for which the distance is greater than or equal to the threshold.

Figure 14:
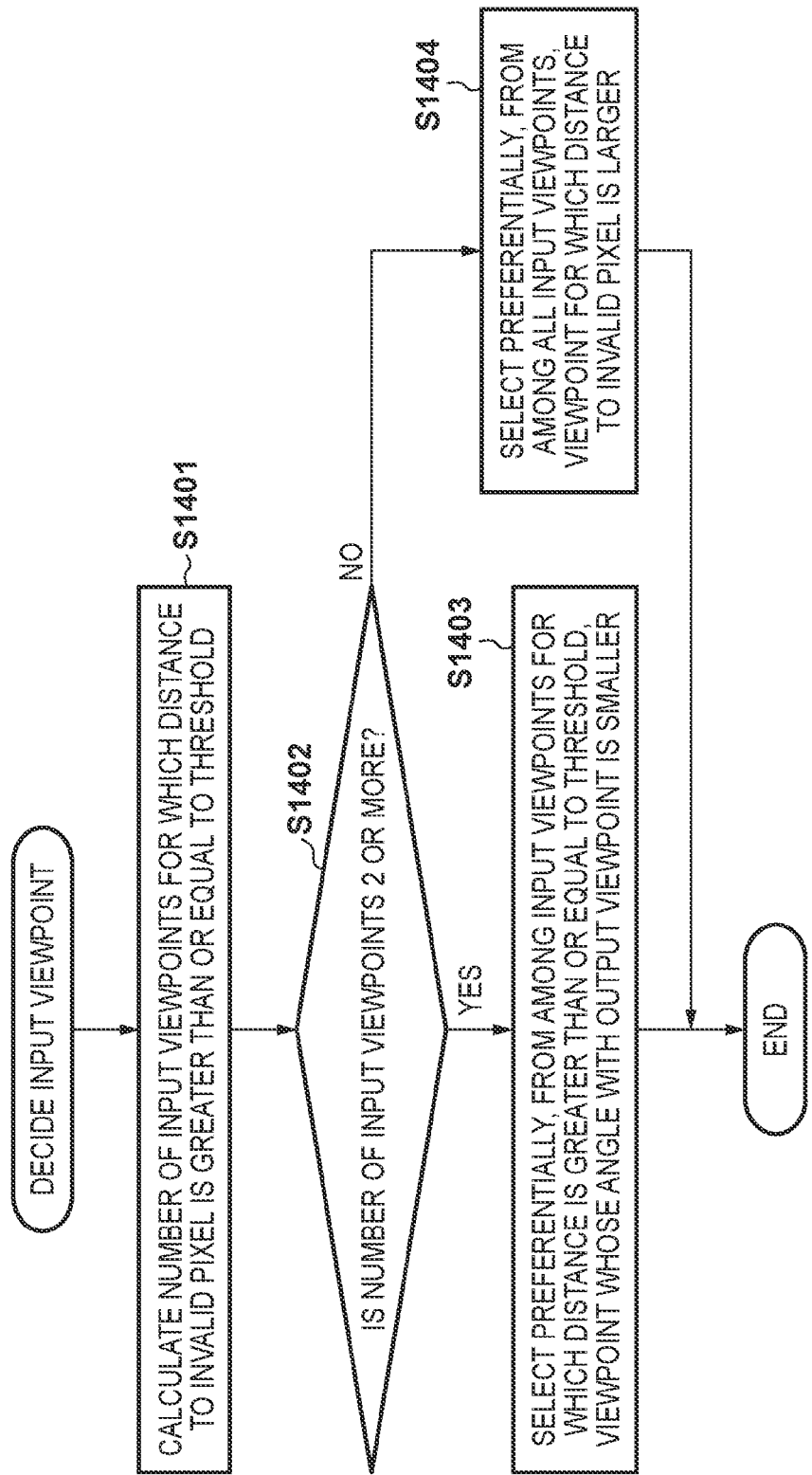
FIG. 14 is a flowchart for deciding a viewpoint referred to when the virtual-viewpoint image is generated.

FIG. 14 is a concrete example of the processing in step S1208. Firstly, the output-image generating unit 210, in step S1401, calculates the number of input viewpoints for which the distance (also, contributing ratio) until the invalid pixel is a threshold or more. Then, in step S1402, the output-image generating unit 210 determines whether the number of input viewpoints is 2 or more, and if it is 2 or more, the processing branches to step S1403, and if not the processing branches to step S1404. In step S1403, the output-image generating unit 210 preferentially decides from among the candidates of input viewpoints for which the distance to an invalid pixel is the threshold or more, a viewpoint whose angle with the output viewpoint is smaller. Meanwhile, in a case where the processing has proceeded to step S1404, the possibility that the color of the pixel of interest will be unnatural cannot be denied, but since it is necessary to decide the pixel value of the pixel of interest, the output-image generating unit 210 preferentially decides a viewpoint whose distance to an invalid pixel is larger from among all of the input viewpoints.

Note that the pixel value of the pixel of interest may be decided from two corresponding pixels in accordance with the following equations.

$$Q(x, y) = \frac{\left(\frac{\theta_2}{\theta_1+\theta_2} \times \frac{W_1(x_1, y_1)}{W_1(x_1, y_1)+W_2(x_2, y_2)}\right)}{W} P_1(x_1, y_1) + \frac{\left(\frac{\theta_1}{\theta_1+\theta_2} \times \frac{W_2(x_2, y_2)}{W_1(x_1, y_1)+W_2(x_2, y_2)}\right)}{W} P_2(x_2, y_2)$$

Here, $$W = \frac{\theta_2}{\theta_1+\theta_2} \times \frac{W_1(x_1, y_1)}{W_1(x_1, y_1)+W_2(x_2, y_2)} + \frac{\theta_1}{\theta_1+\theta_2} \times \frac{W_2(x_2, y_2)}{W_1(x_1, y_1)+W_2(x_2, y_2)}$$

Q(x,y): pixel value of the pixel of interest of the output image
P1(x1,y1): pixel value of corresponding pixel (x1,y1) of first input viewpoint
P2(x2,y2): pixel value of corresponding pixel (x2,y2) of second input viewpoint
θ1: angle formed by first input viewpoint
θ2: angle formed by second input viewpoint
W1(x1,y1): weighting of corresponding pixel (x1,y1) in weighted-pixel map of first input viewpoint
W2(x2,y2): weighting of corresponding pixel (x2,y2) in weighted-pixel map of second input viewpoint As described above, by virtue of the present embodiment, it becomes possible to suppress image degradation of a boundary of an object in a virtual-viewpoint image generated from image from a plurality of viewpoints more than conventionally.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-170068, filed Aug. 31, 2016 which is hereby incorporated by reference herein in its entirety.

What is claimed is:

1. An image processing apparatus comprising:
at least one memory storing instructions; and
at least one processor executing the instructions to:
   detect a boundary region of an object in a captured image captured by an image capturing device;
   generate, based on the detected boundary region, a pixel map representing a contributing ratio for generating a virtual-viewpoint image for each pixel position of the captured image; and
   generate the virtual-viewpoint image based on captured images captured by a plurality of image capturing devices and the generated pixel map,
   wherein the contributing ratio is a value according to a distance between the boundary region of the object and the pixel position of the captured image.

2. The apparatus according to claim 1, wherein the at least one processor executes the instructions to:

generate a silhouette image for distinguishing between the object and a background from a difference between a background image that lacks the object and an image including an object, generate a first map for distinguishing between a boundary pixel and a non-boundary pixel in the object from a depth image and the silhouette image, and generate, based on the first map, as the pixel map a second map including values that represent a contribution rate according to a distance from a boundary pixel, where a boundary pixel is made to have a minimum contribution rate.

3. The apparatus according to claim 2, wherein the second map is generated by performing morphology processing in relation to the first map.

4. The apparatus according to claim 1, wherein the at least one processor executes the instructions to, when obtaining a pixel value of a pixel of interest in the virtual-viewpoint image to be generated, in a case where there are a plurality of pixel maps for which the contributing ratio of a position corresponding to the pixel of interest exceeds a threshold that is set in advance out of the pixel maps of the captured images, use two images for which an angle formed with a generated virtual-viewpoint is smaller, from among the captured images, for which the threshold is exceeded.

5. The apparatus according to claim 4, wherein the at least one processor executes the instructions to, when obtaining a pixel value of a pixel of interest in the virtual-viewpoint image to be generated, in a case where there are less than 2 pixel maps for which the contributing ratio of a position corresponding to the pixel of interest exceeds the threshold that is set in advance out of the pixel maps of the captured images, use the two images for which the contributing ratio is highest, from among all of the captured images.

6. The apparatus according to claim 1, wherein the contributing ratio for pixel position in the boundary region of the object in the captured image is different from the contributing ratio for pixel position in a non-boundary region of the object in the captured image.

7. The apparatus according to claim 1, wherein a first contributing ratio at a position of a first pixel is larger than a second contributing ratio at a position of a second pixel, which is nearer to the boundary region of the object in the captured image than the first pixel.

8. A method of controlling an image processing apparatus, the method comprising:

detecting a boundary region of an object in a captured image captured by an image capturing device;

generating, based on the detected boundary region, a pixel map representing a contributing ratio for generating a virtual-viewpoint image for each pixel position of the captured image; and generating the virtual-viewpoint image based on captured images captured by a plurality of image capturing devices and the generated pixel map, wherein the contributing ratio is a value according to a distance between the boundary region of the object and the pixel position of the captured image.

9. A non-transitory computer-readable storage medium storing a program executable by a computer to execute a method for controlling an image processing apparatus, the method comprising:

detecting a boundary region of an object in a captured image captured by an image capturing device;

generating, based on the detected boundary region, a pixel map representing a contributing ratio for generating a virtual-viewpoint image for each pixel position of the captured image; and generating the virtual-viewpoint image based on captured images captured by a plurality of image capturing devices and the generated pixel map, wherein the contributing ratio is a value according to a distance between the boundary region of the object and the pixel position of the captured image.

10. An image processing apparatus comprising:

at least one memory storing instructions; and at least one processor executing the instructions to:

generate depth images corresponding to captured images captured by a plurality of image capturing devices, based on shape information representing a shape of the object in the captured images;

detect, based on one depth image, among the generated depth images, a boundary region of an object in a captured image, corresponding to the one depth image, captured by one of the plurality of capturing devices;

generate, based on the detected boundary region, a pixel map representing a contributing ratio for generating a virtual-viewpoint image for each pixel position of the captured image; and generate the virtual-viewpoint image based on captured images captured by the plurality of image capturing devices and the generated pixel map.

11. The apparatus according to claim 10, wherein the at least one processor, in detecting the boundary region of the object, executes the instructions to:

decide a threshold in accordance with a value of a pixel of interest in the one depth image; and detect the boundary region of the object by comparing the threshold and a difference between the pixel of interest and an adjacent pixel.

12. The apparatus according to claim 10, wherein the one depth image is a set of pixels that represent distances between the viewpoint of the respective image capturing device of the captured image corresponding to the one depth image and points on the object.

13. An image processing apparatus comprising:

at least one memory storing instructions; and at least one processor executing the instructions to:

detect a boundary region of an object in a captured image captured by an image capturing device;

calculate, based on the detected boundary region a contributing ratio for generating a virtual-viewpoint image for each pixel position of the captured image; and generate the virtual-viewpoint image based on captured images captured by a plurality of image capturing devices and the calculated contributing ratio, wherein the contributing ratio is a value according to a distance between the boundary region of the object and the pixel position of the captured image.

14. An image processing apparatus comprising:

at least one memory storing instructions; and at least one processor executing the instructions to:

generate depth images corresponding to captured images captured by a plurality of image capturing devices, based on shape information representing a shape of the object in the captured images;

detect, based on one depth image, among the generated depth images, a boundary region of an object in a captured image, corresponding to the one depth image, captured by one of the plurality of image capturing devices;

generate a virtual-viewpoint image based on captured images captured by the plurality of image capturing devices and a pixel value of a pixel other than a pixel in the detected boundary region, without using a pixel value of the pixel in the detected boundary region.

* * * * *